United States Patent
Yura

(10) Patent No.: US 6,327,373 B1
(45) Date of Patent: Dec. 4, 2001

(54) MAIL ADDRESS READING APPARATUS AND MAIL SORTING APPARATUS

(75) Inventor: Koji Yura, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/251,747

(22) Filed: Feb. 18, 1999

(30) Foreign Application Priority Data

Feb. 18, 1998 (JP) .................................................. 10-036248

(51) Int. Cl.[7] ..................................................... G06K 9/00
(52) U.S. Cl. .............................................................. 382/101
(58) Field of Search ................................... 382/100, 101, 382/102, 312, 317, 321, 323; 209/535, 536, 546, 547, 552, 554, 606, 612, 613, 900

(56) References Cited

U.S. PATENT DOCUMENTS

| | | | |
|---|---|---|---|
| 4,481,665 | | 11/1984 | Ota ........................................ 382/102 |
| 5,050,218 | * | 9/1991 | Ikeda et al. ........................... 382/101 |
| 5,249,687 | * | 10/1993 | Rosenbaum et al. ................. 209/3.3 |
| 5,422,821 | * | 6/1995 | Allen et al. ........................... 700/219 |
| 5,515,455 | * | 5/1996 | Govindaraju et al. ............... 382/186 |
| 5,667,078 | * | 9/1997 | Walach ................................. 209/584 |
| 5,734,568 | * | 3/1998 | Borgendale et al. ................. 700/224 |
| 5,737,437 | * | 4/1998 | Nakao et al. ......................... 382/101 |
| 5,805,710 | * | 9/1998 | Higgins et al. ...................... 382/101 |
| 6,246,794 | * | 6/2001 | Kagechiro et al. .................. 382/185 |

FOREIGN PATENT DOCUMENTS

| | | | |
|---|---|---|---|
| 0 517 297 | 12/1992 | (EP) | ................................ G06K/9/80 |
| 8-227427 | 9/1996 | (JP) | ................................ G06F/17/30 |
| 9-24342 | 1/1997 | (JP) | ................................ B07C/3/00 |

OTHER PUBLICATIONS

Occena et al., "A logic–based framework for address interpretation and rectification", Computers in Industry, NL, Elsevier Science Publishers. Amsterdam, vol. 20, No. 1, Jul. 1, 1992, pp. 63–73, XP000288646 ISSN: 0166–3615 Section "5.1 Compensation Module".

Prussak et al., "A Multi–level Pattern Matching Method for Text Image Parsing", Proceedings of the Conference on Artificial Intelligence Applications, US, New York, IEEE, vol. Conf. 7, Feb. 24, 1991, pp. 183–189, XP000298922 ISBN: 0–8186–2135–4 Section "2. Algorithm Description".

Kabir et al., "Recognition and Verification of Postcodes in Handwritten and Hand–printed Addresses", Proceedings of The International Conference on Pattern Recognition, US, Los Alamitos, IEEE Comp. Soc. Press, vol. Conf. 10, Jun. 16, 1990, pp. 469–473, XP000166349 ISBN: 0–8186–2062–5.

Dowton et al., "Syntatic and Contextual Post–Processing of Handwritten Addresses for Optical Character Recognition", Proceedings of The International Conference on Pattern Recognition. (ICPR), US, Washinton, IEEE Comp. Soc. Press, vol. Conf. 9, Nov. 14, 1988, pp. 1072–1076, XP000013062 ISBN: 0–8186–0878–1.

* cited by examiner

Primary Examiner—Andrew W. Johns
Assistant Examiner—Shervin Nakhjavan
(74) Attorney, Agent, or Firm—Pillsbury Winthrop LLP

(57) ABSTRACT

In a mail address reading apparatus, when a probable candidate for a zip code is not obtained at the zip code reading step, without performing more detailed recognition of the zip code, a step for determining a destination line with honorific characters as an addressee name line is performed so as to read an addressee name from the determined line. Subsequently, an address is read from a destination address line adjacent to the addressee name line at the destination determination step.

8 Claims, 10 Drawing Sheets

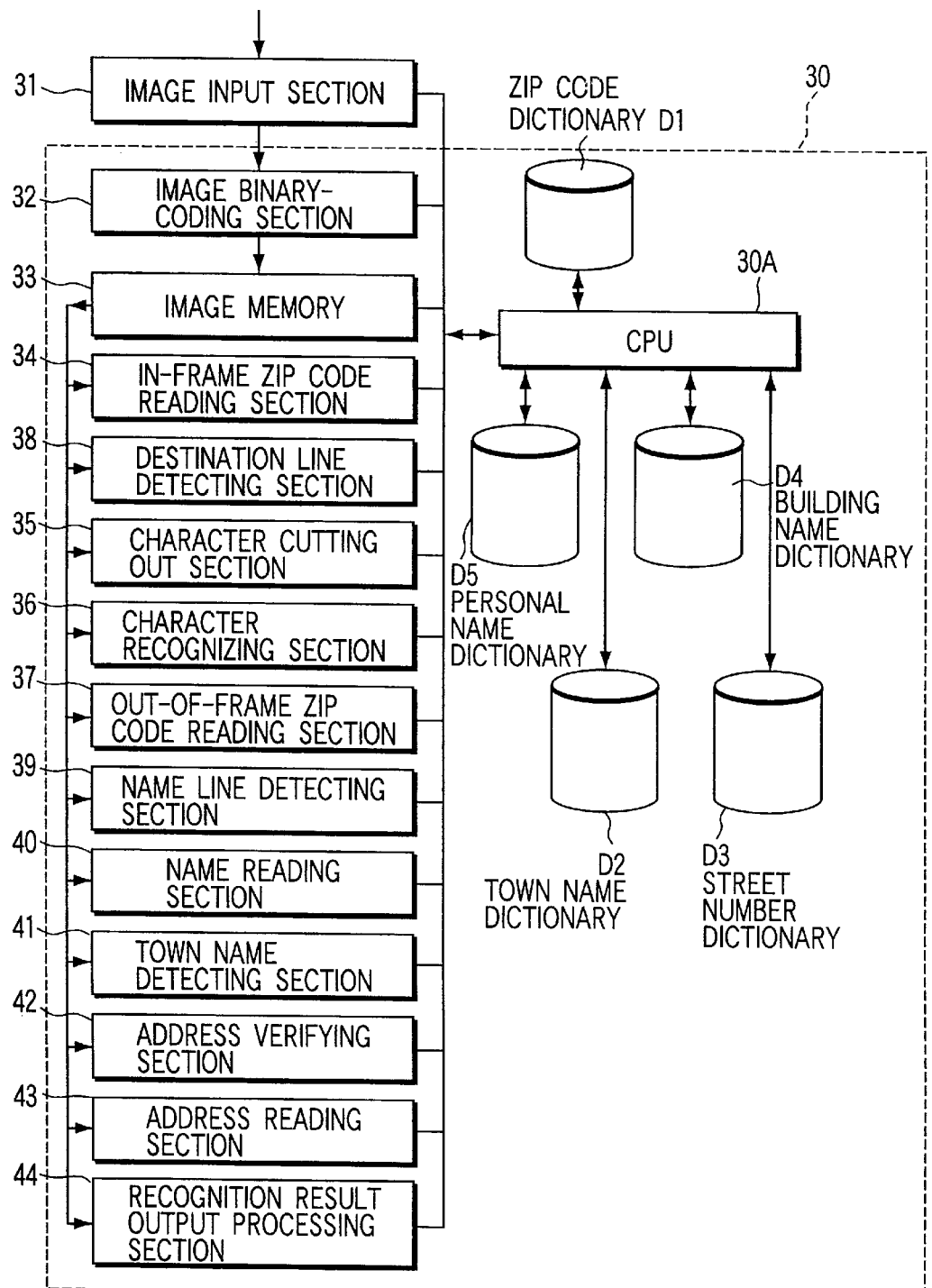
F I G. 1

| PRIORITY | 1 | 2 | 3 |
|---|---|---|---|
| FIRST CHARACTER | D | O | B |
| SECOND CHARACTER | r | i | v |
| THIRD CHARACTER | . | , | : |
| FOURTH CHARACTER | O | C | U |
| ⋮ | ⋮ | ⋮ | ⋮ |
| 12-TH CHARACTER | U | V | O |
| 13-TH CHARACTER | K | H | Y |
| 14-TH CHARACTER | A | H | B |

| PRIORITY | 1 | 2 | 3 | 4 | 5 | 6 | 7 | 8 | 9 | 10 |
|---|---|---|---|---|---|---|---|---|---|---|
| FIRST CHARACTER | 飯 | 頷 | 隊 | 鍬 | 鎌 | 撒 | 胤 | 豚 | 祢 | 鋲 |
| SECOND CHARACTER | 塚 | 堀 | 堺 | 琢 | 雄 | 堆 | 垢 | 堰 | 塔 | 蛭 |
| THIRD CHARACTER | 治 | 洛 | 冶 | 潜 | 盗 | 姿 | 浩 | 濫 | 雰 | 宥 |
| FOURTH CHARACTER | 猿 | 俵 | 様 | 痕 | 隊 | 厳 | 浪 | 隠 | 娘 | 狼 |

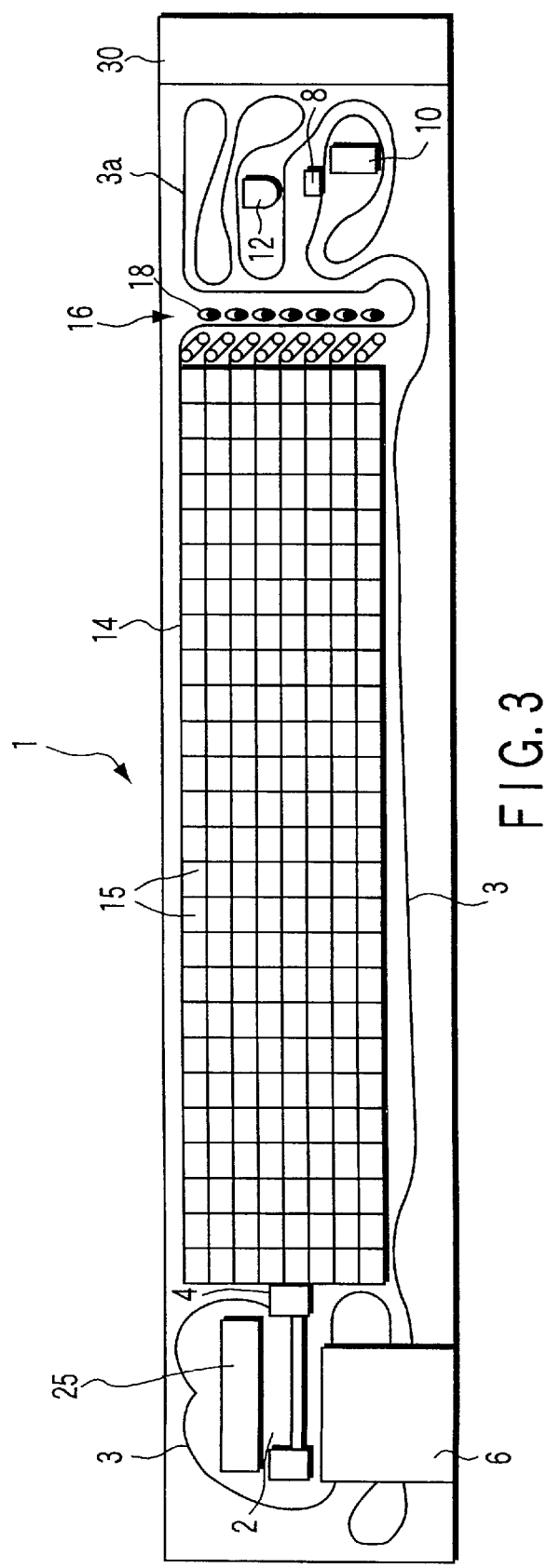

MAIL ADDRESS READING APPARATUS AND MAIL SORTING APPARATUS

BACKGROUND OF THE INVENTION

The present invention relates to a mail address reading apparatus and a mail sorting apparatus for reading a zip code, an address, and an addressee name written on the surface of a piece of mail, and determining a destination based on the read results.

In a field of processing mail, a great deal of mail collected everyday must be processed in a limited time. Therefore, mail services have been mechanized to lighten the loads on post-office clerks.

For example, zip codes on pieces of mail are read by an optical character reader (OCR). The pieces of mail are sorted by a dispatching sorter into sections corresponding to delivery post offices based on the read results. Further, the addresses on the mail are read and the pieces of mail are sorted into a plurality of delivery sections by a delivery sorter.

Recent delivery sorters can read detailed information, such as lot numbers, house numbers, room numbers of apartment houses, and names of addressees. Further, dispatching sorters can specify the towns of addresses by reading the zip codes. A delivery sorter reads a street or avenue number, a house number and a building name of the address by character recognition. Further, it reads the name of the addressee also by character recognition.

When the zip code and the address are printed by a printer or the like, characters can be read by an OCR relatively accurately. However, in general, an OCR cannot easily recognize handwritten characters. In particular, handwritten Chinese and Arabic numerals are difficult to recognize. For example, FIG. 2, columns (a) and (b) show handwritten Arabic numerals "2" and "3", which are difficult to distinguish even by human eyes. Similarly, the numerals in the columns (c) and (d) are intended to be Arabic numerals "4" and "9", but they are very similar and hardly distinguished.

If the above-mentioned handwritten numerals are used in a zip code, a very highly-developed character recognition process must be used to recognize them. In this case, a considerable time is required for the recognition and there is no guarantee that the result of the recognition is correct. Further, if a street or avenue number and a house number are handwritten, the same problem may arise.

BRIEF SUMMARY OF THE INVENTION

It is an object of the present invention to provide a mail address reading apparatus and a mail sorting apparatus which can read an address accurately and quickly, even if a character portion including a zip code, a street or avenue number and a house number is difficult to recognize.

According to an embodiment of the present invention, there is provided a mail address reading apparatus comprising: first reading means for reading a zip code recorded on a mail item; second reading means for reading an addressee name recorded on the mail item; third reading means for reading a destination address including a town name and a street number recorded on the mail item with reference to information on the addressee name read by the second reading means; and control means for determining a destination based on the zip code, the addressee name and the destination address read by the first to third reading means.

Further, according to the present invention, there is also provided a mail sorting apparatus comprising: first reading means for reading an address image of a mail item; destination detecting means for detecting a destination from the address image read by the first reading means; and sorting means for sorting the mail item based on the destination detected by the detecting means, the destination detecting means including: second reading means for reading a zip code recorded on the mail item; third reading means for reading an addressee name recorded on the mail item; fourth reading means for reading a destination address including a town name and a street number recorded on the mail item with reference to information on the addressee name read by the third reading means; and control means for determining a destination based on the zip code, the addressee name and the destination address read by the second to fourth reading means.

With the above structure, when a candidate for a zip code written in or out of frames is obtained, an addressee name is subsequently read from an addressee name line. When a single probable solution of the destination is obtained, the solution is determined to be the destination of the mail item.

When no candidate for a zip code written in or out of frames is obtained by the normal recognizing operation, more detailed recognition is not performed, but a destination line, which appears to indicate the addressee name, is detected. When it is confirmed that the last character of the line is an honorific character, the line including the character is determined to be an addressee name line and the name of the addressee is read.

When a single probable solution of the destination is not obtained by the combination of the addressee name and the zip code, another destination line is determined on the basis of the first-determined destination line and an address is read. Thus, it is possible to provide a mail address reading apparatus and a mail sorting apparatus, which can reliably read the address, even if a character portion, such as a zip code, a street number, etc. is difficult to recognize.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing functions of an address reading apparatus according to an embodiment of the present invention;

FIG. 3 is a structural diagram showing the overall structure of a mail sorter to which the present invention is applied;

DETAILED DESCRIPTION OF THE INVENTION

Figures 2, 5, 6:
FIG. 2 is a diagram showing examples of confusing characters hand-written on mail.
FIG. 5 is a diagram showing first to tenth candidates for the name of an addressee read from the mail items shown in FIGS. 4A and 4B.
FIG. 6 is a diagram showing first to third candidates for the name of an addressee read from the mail item shown in FIG. 4C.

An embodiment of the present invention will be described with reference to the accompanying drawings. First, the structure of a mail sorter 1 to which the present invention is applied will be described with reference to FIG. 3. The mail sorter 1 comprises a feeding unit 2 for aligning a plurality of mail items in random orientations and positions, setting up and holding them with long sides thereof down, for example, and successively feeding the mail items to a predetermined pickup position. A pickup unit 4 for picking up the mail items fed by the feeding unit 2 to the pickup position one by one to a main transfer path 3. A reading unit 6 is provided on the main transfer path 3 for transferring the mail items picked up by the pickup unit 4. The reading unit 6 includes an optical character reader (OCR) for optically reading destination information, such as the zip code, address and name of an addressee, from each mail item. It also includes a bar code reader for reading the bar code printed on the mail item corresponding to the destination information read by the OCR. If the mail items are aligned such that the main surfaces thereof are directed to the same direction, the OCR and the bar code reader are provided on only one side of the main transfer path. If not, the OCR and the bar code reader are provided on both sides thereof.

The downstream part of the main transfer path 3 from the reading unit 6 extends under a sorting and collecting unit 14 (described later). On the main transfer path 3, an aligning unit 8 for aligning the leading edges of mail items and a printing unit 10 including an ink jet printer for printing a bar code indicating the address information read by the reading unit 6 on the mail item are provided on the right side of the sorting and collecting unit 14 in the drawing. The downstream part of the main transfer path 3 from the printing unit 10 is connected to a delay transfer path 3a for delaying arrival of mail items to the sorting and collecting unit 14. A bar code reader 12 for confirming whether a bar code is correctly printed by the printer 10 on a mail item is provided on the delay transfer path 3a.

The terminal end of the delay transfer path 3a is connected to the sorting and collecting unit 14 for sorting mail items and collecting them in sort pockets 15. The delay transfer path 3a has a purpose of allowing to dry ink of bar codes printed on mail items by the printing unit 10. In this embodiment, the transfer speed is not delayed, but the delay transfer path is as long as about 10 meters to 15 meters. Otherwise, the transfer speed may be delayed without increasing the length of the delay transfer path 3a.

The sorting and collecting unit 14 has a plurality of collecting stages stacked in the vertical direction. Each collecting stage is divided into a plurality of sort pockets 15 arranged in the horizontal direction. A stage path portion 16 is provided commonly to and extending between the collecting stages. The stage path portion 16 is provided at an entrance part of each collecting stage constituted with the sort pockets 15. The stage path portion 16 has a plurality of switching gates 18 for selectively communicating the stage path portion 16 with the collecting stages of the sort pockets 15.

Thus, the plurality of switching gates 18 for selectively connecting the stage path portion 16 to the collecting stages of the sort pockets 15 are provided on the stage path portion 16 corresponding to the respective collecting stages.

The address information read by the reading unit 6 is supplied to a control unit 30 (described later), which determines a sort pocket 15 where the mail item is to be supplied, on the basis of the destination information read by the reading unit 6, such as the zip code, address and name of an addressee. The switching gates 18 and the sorting gates (not shown) provided on the respective sort pockets 15 are selectively switched in accordance with the determined sort pocket 15. Thus, the respective mail items are sorted to the determined sort pockets 15.

The mail sorter 1 comprises the control unit 30 including a CPU 30A for reading the destinations of mail items and controlling the operation of the mail sorter 1 on the basis of the read destinations. The mail sorter 1 also comprises in a left side portion thereof an operation display panel 25 for displaying operation guidance, etc. in response to an operation input by the operator. As shown in FIG. 1, the control unit 30 includes a zip code dictionary D1, a town name dictionary D2, a street number dictionary D3, a building name dictionary D4 and a personal name dictionary D5, all of which are connected to the CPU 30A.

As will be described in detail later, the zip code dictionary D1 is used to recognize the zip code recorded in or out of frames. The zip code dictionary D1 functions as a character dictionary for recognizing individual character composing the zip code and functions as a word dictionary for recognizing a character string including seven numeric characters, for example, as the zip code. The remaining dictionaries D2 to D5 are also composed to function as a character dictionary as well as a word dictionary, respectively.

As will be described in detail later, the personal name dictionary D5 stores a table representing a relationship between a zip code and a list of personal names residing in the address determined by the zip code. The personal names can be taken out of the dictionary 5 by using the zip code as a key word.

FIG. 1 is a functional block diagram showing a destination reading portion incorporated in the control unit 30 according to this embodiment.

Referring to FIG. 1, an image input portion 31 fetches image data of a mail item including the destination information supplied from the image information reading unit 6 shown in FIG. 3. A binary-coding section 32 binary-codes the image data. The binary-coded image data is first stored in an image memory 33. The above and following operations are controlled by the CPU 30A included in the control unit 30.

Figure 7:
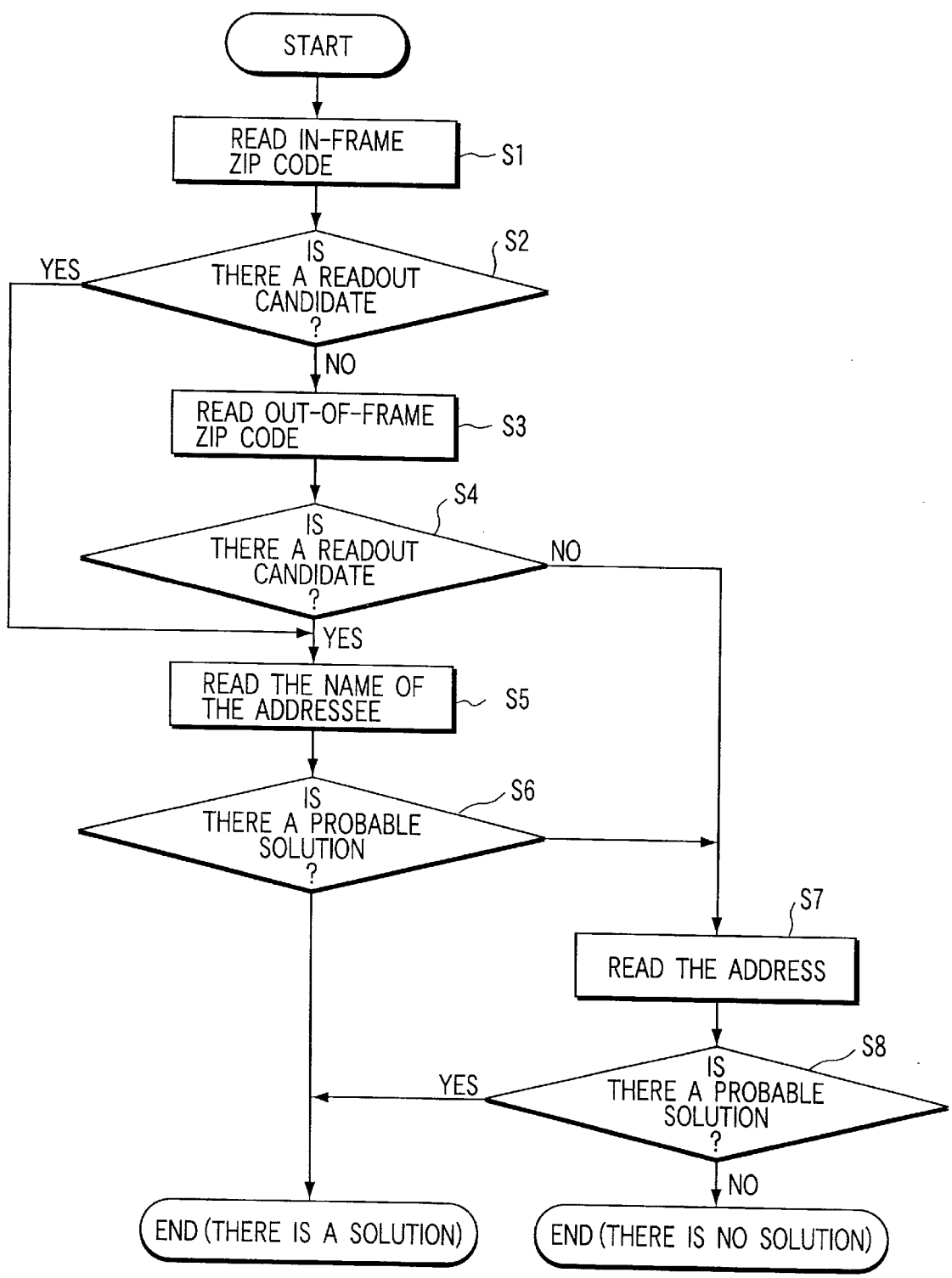
FIG. 7 is a flowchart showing the overall operation of the embodiment shown in FIG. 1.

Image data of the mail item read from the image memory 33 is transmitted to an in-frame zip code reading section 34 in a step S1 shown in FIG. 7. The in-frame zip code reading section 34 searches the image data for a series of zip code frames in a standard position. If there is a series of zip code frames, the section 34 searches numerals constituting a zip code in the frames. For example, the zip code "210-0915" recorded in the zip code frames 52 is read from a mail image 51 shown in FIG. 4A which shows one example of an image of a domestic mail item in Japan.

Figure 8:
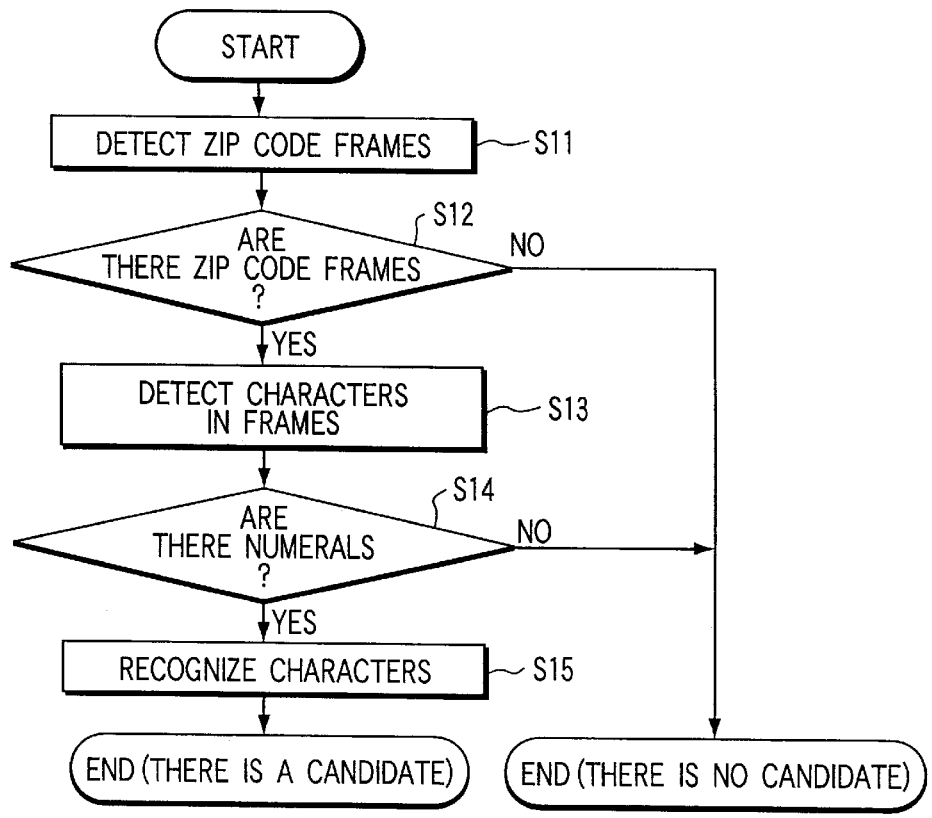
FIG. 8 is a flowchart showing an operation for reading a zip code written in frames.

A process of reading an in-frame zip code will be described in detail with reference to FIG. 8 showing detailed operations performed in the step S1 of FIG. 7. The operations for reading the in-frame zip code is performed by an in-frame zip code reading section 34 shown in FIG. 1. The operations of the section 34 is performed under the control of the CPU 30A.

First, zip code frames are detected in a step S11. In the cases of mail images 51 and 61 of Japanese domestic mail items shown in FIGS. 4A and 4B, the zip code frames are seven rectangular frames 52 and 62, hyphenated at the point between the third and fourth frames.

Figure 4A:
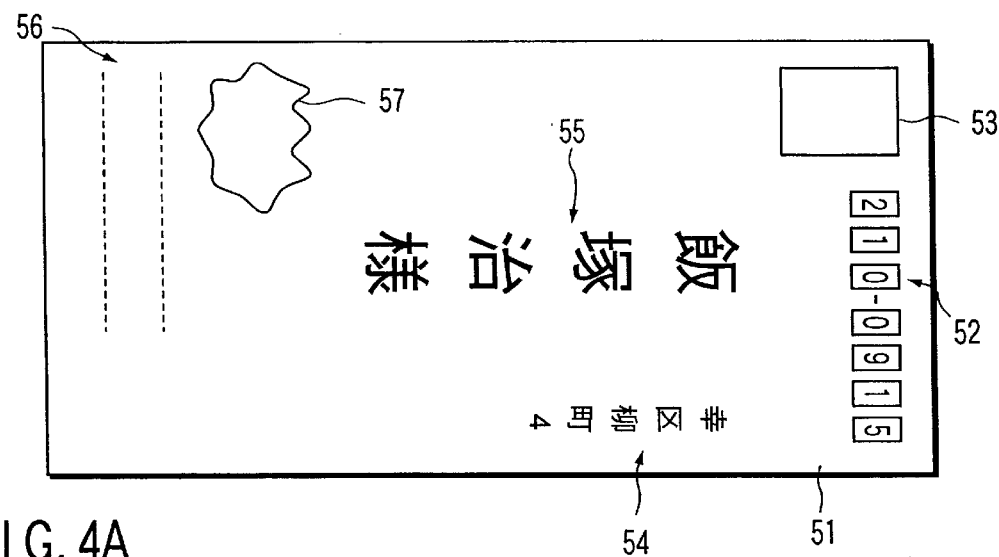
FIGS. 4A to 4C are diagrams showing images of different mail items.

For example, to detect the series of zip code frames 52 in the mail image 51 shown in FIG. 4A, a stamp portion 53 in an upper right portion of the mail image 51 in the figure is first detected. Then, a series of seven small rectangular frames near the stamp portion 53 is detected. The detection of the series of the frames can be realized by a well-known method such as labeling process easily. The detected frames are recognized as the zip code frames 52.

Figure 4B:
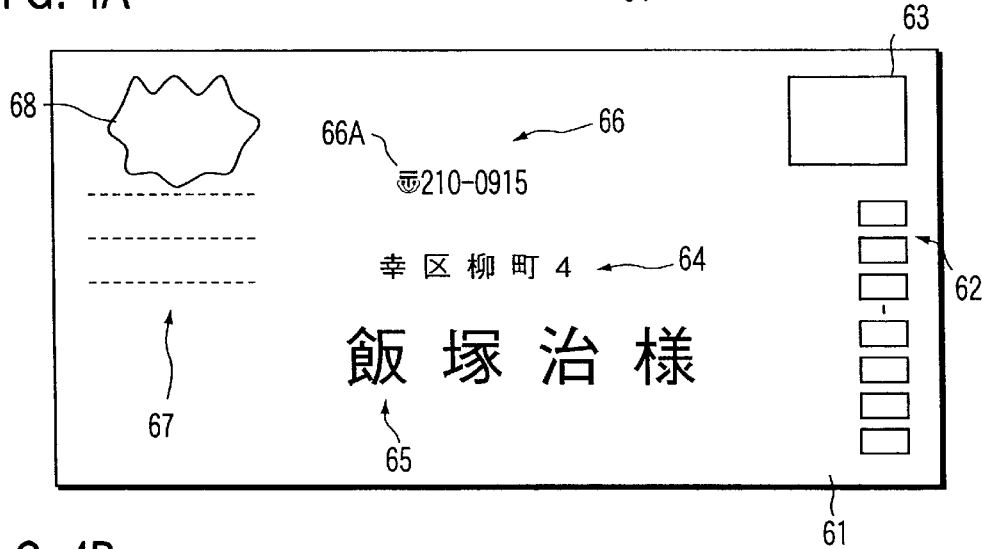

In the case of the mail image 61 shown in FIG. 4B, the seven continuous frames 62 are detected as a series of zip code frames in the same manner as in the case of the mail image 51.

Figure 4C:
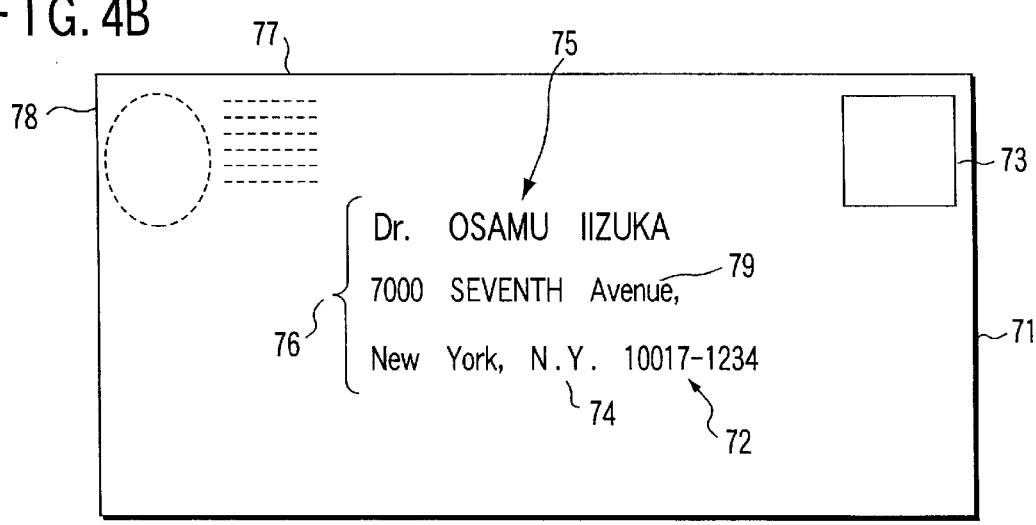

FIG. 4C shows a mail image 71 to be handled as a U.S. domestic mail item having a destination in United States of America, wherein a zip code 72 is written or printed after a state's name 74 in the last line of the destination lines 76 without zip code frames. The present invention can be applied to such a mail item shown in FIG. 4C, having no zip code frames and having a zip code recording position different from that of the Japanese domestic mail items shown in FIGS. 4A and 4B. The detection of a zip code in this FIG. 4C case will be described later.

Referring back to FIG. 8, when the series of frames 52 shown in FIG. 4A is detected, it is determined that there are zip code frames in a step S12, and the flow advances to a step S13. In the step S13, it is checked whether there are characters in the detected frames 52. The steps S12 and S13 are performed by a character cutting out section 35 of FIG. 1 under the control of the in-frame zip code reading section 34.

When the operation of the in-frame zip code reading section 34 is executed in a step S14 and it is determined that there are seven Arabic numerals in the frames, the numerical characters in the respective frames are cut out by a character cutting-out section 35 shown in FIG. 1, and recognized by a character recognizing section 36 in a step S15. If a seven-digit number is detected, the number is regarded as the result of zip code reading, and it is determined that there is a candidate for a zip code. It is possible that numerals of only upper three digits are detected, while those of lower four digits to the right of the hyphen are not. In this case also, it is determined that there is a candidate for a zip code.

If it is not determined in the step S14 in FIG. 8 that a zip code is detected in the zip code frames, then it is determined in a step S2 in FIG. 7 that there are no numerals in the frames, i.e., no readout candidate. The determination of the step S2 is performed by the in-frame zip code reading section 34 of FIG. 1.

Since the characters detected in the above procedure are surrounded by the frames 52, the images of the frames 52 obstruct the character recognition. To overcome this problem, the images of the frames 52 may be excluded from the subject of recognition, so that only the characters can be recognized. The images of the frames 52 can be removed by means of the technique disclosed in, for example, U.S. Pat. No. 5,737,437. The entire contents of this U.S. Pat. No. 5,737,437 are incorporated herein by reference. After the images of the frames 52 are removed, the characters are cut out one by one from the series of characters and subjected to the character recognition.

The character recognition, i.e., the recognition of the numeric characters of the zip code in a step S15 of FIG. 8 is performed by the character recognition section 36 under the control of the in-frame zip code reading section 34. The characters being recognized by the character recognition section 34 are Arabic numerals. The recognition of the individual numeric characters and the series of characters as the zip code is performed, respectively, by the character dictionary and the word dictionary provided in the zip code dictionary D1.

If there is a candidate for the read zip code, the flow advances to a step S5 shown in FIG. 7 in which an operation for reading the name of an addressee is performed (to be described in detail later), without performing further detailed recognition of the zip code, even if a probable candidate is not obtained. The detailed recognition of the zip code may include repeating or retrying the steps S1 and S2, for example.

If it is determined that there are no numerals in the frames in the step S2 in FIG. 7, the flow advances to a step S3, in which an out-of-frame zip code is read by using an out-of-frame zip code reading section 37. In the case of an in-frame zip code, the position of the zip code can be easily detected by detecting the series of frames 52. However, to read a zip code written out of frames, it is necessary to detect first where the zip code is written.

In general, when a zip code is not written in frames 62 as in the case of FIG. 4B, it is written in a portion 66 adjacent to the destination lines 64 and 65. In the case of FIG. 4C, the zip code 72 is provided at the last portion in a line included in destination lines 76 other than an addressee name line 75. There fore, in the case of FIG. 4B, the lines 64 and 66 excluding the line 65 of name of the addressee, are first detected as destination lines, and it is checked whether a zip code is written in the detected destination lines 64 and 66. If a zip code is detected in one of the detected destination lines, a series of characters in the zip code is read by an out-of-frame zip code reading section 37, so that the zip code can be read.

In the case of FIG. 4C showing a mail image 71 of the U.S. domestic mail item, a destination line including the zip code 72 is detected from a plurality of destination lines 76 other than an addressee name line 75 so that t he series of characters are recognized as the zip code 72.

Operations of the out-of-frame zip code reading section 37 are executed by the steps S3 and S4. When an out-of-frame zip code is read in the step S3, destination lines are detected by a destination line detecting section 38. Of the character lines 64, 65 and 66 on the mail image 61 having a stamp 63 in its upper right end portion in FIG. 4B, the destination line detecting section 38 detects the central line 64 and the line 65 thereunder as destination lines, and the line 66 above the central line 64 as a zip code line. The examples shown in FIGS. 4A, 4B and 4C include Figures 57, 68 and 78 and character lines 56, 67 and 77 indicated in an upper left portion of the respective drawings. However, they are addresses and names of the senders in consideration of the positions thereof in the mail image, and is set not to detect as destination lines.

When a candidate of the zip code is obtained, the operation goes from step S4 to step S5 to read the name of the addressee on the basis of the candidate zip code, without performing a further detailed recognition of the zip code, even if a probable candidate is not obtained. This operation is performed by the name reading section for reading the addressee 40 shown in FIG. 1 according to the flow chart shown in FIG. 11. The detailed explanation of the operation will be described later by referring to FIG. 11.

An operation for reading an out-of-frame zip code in the mail image 61 shown in FIG. 4B will be described with reference to FIG. 9 which shows in detail the operation of the step S3 shown in FIG. 7. First, the out-of-frame zip code reading section 37 outputs an operation command to the destination line detection section 38 to detect the destination lines 64, 65 and 66 in a step S31 in the following known manner. For example, the mail image 61 is projected in vertical and lateral directions. The direction, in which the projection output of the images 64, 65 and 66 is greater, is determined to be a line direction. The projected image is cut into portions at intervals between projection output portions in a direction perpendicular to the line direction, i.e., at portions where the level of a projection output is reduced at a regular interval. The cut portions are respectively determined to be character regions. The same destination line reading operation is performed with respect to the mail images shown in FIGS. 4A and 4C.

In the case of the mail image 61 shown in FIG. 4B, three lines of characters 64–66 are detected as destination lines in the step S31. In a next step S32, it is detected that there are three unprocessed destination lines in the initial state, by the out-of-frame zip code reading section 37. Therefore, the flow advances to a step S33 where the operation of the character cutting out section 35 is executed. In the step S33, the unprocessed destination lines are successively selected one by one, and characters included in the selected line are cut out. Then, each of the cutout characters is subjected to character recognition by the character recognizing section 36 in a step S34. Results of the character recognition are stored in a memory (not shown) in the CPU 30A in unit of the selected destination line.

When the character recognition with respect to an unprocessed line is completed in the step S34, the flow to the step S32. Then, the same process is performed with respect to another unprocessed line, and results of character recognition are stored in the memory. When the three lines have been completely processed and no unprocessed line remains, the flow advances from the step S32 to a step S35. In the step S35 to be executed by the out-of-frame zip code reading section 37, the results of the character recognition stored in the memory are analyzed on predetermined conditions, thereby detecting a series of characters of the zip code.

In the case of the mail image 61 of the Japanese domestic mail item as shown in FIG. 4B, generally, the uppermost line 66 of the three destination lines 64 to 66 is a zip code line and the lowermost line 65 is an addressee name line. Therefore, the uppermost destination line 66 is first subjected to the process of the step S35. If it is detected that the destination line 66 includes seven Arabic numerals with a hyphen interposed in a middle portion, the line is determined to be a zip code line. In a step S36, it is determined that there is a zip code candidate. Then, it is determined in the step S4 of FIG. 7 that the out-of-frame zip code is recorded on the mail item. Alternatively, if the top of the line to be processed is a mail mark 66A, the line can be determined to be a zip code line.

In the case of the US domestic mail item as shown in FIG. 4C, generally, the upper most destination line 75 of the three destination lines 76 is an addressee name line. Therefore, the process of the step S35 is first executed with respect to the lower most destination line 74. As a result, as shown in FIG. 4C, this line 74 is determined to be a zip code line, when five-digit numeric characters and four-digit numeric characters connected by a hyphen are detected, it is determined that the line 74 is a zip code line.

If characters of a zip code are not detected by the out-of-frame zip code reading section 37 in the step S35, it is determined in a step S36 that there is no zip code candidate, and it is determined in step S4 of FIG. 7 that no out-of-frame zip code is detected. In this case, the flow shown in FIG. 7 advances from the step S4 to a step S7, and the address is read (to be described later with reference to the flow chart shown in FIG. 13).

If the in-frame zip code reading section 34 or the out-of-frame zip code reading section 37 obtains a zip code candidate consisting of seven numerals which has a particularly great similarity with a code in the zip code dictionary, the flow shown in FIG. 7 advances to the step S5 for reading the name of the addressee. If a probable sole solution is obtained in a step S6, it is judged that the destination is determined, and the procedure is ended.

FIG. 4C shows an example of a mail image of a U.S. domestic mail item. There are many countries other than USA having a mail system which does not use the zip code frames such as those 52 and 62 used in Japan as shown in FIGS. 4A and 4B. Accordingly, in such countries including USA, the operation of steps S1 and S2 for reading the in-frame zip code is not necessary in the general flow of FIG. 7. In this case, when the mail address reading apparatus and mail sorting apparatus are used in USA, the operation of the step S3 for reading the out-of-frame zip code is set to be executed in the first step.

In the case of the mail image 71 of the U.S. domestic mail item as shown in FIG. 4C, the detected destination lines 76 are laterally written lines. Of the destination lines 76, the upper most line is the addressee name line 75 and the lower most line 74 is for the state's name and the zip code. The zip code character string 72 is usually put at the end of this lower most line 74.

In the case of the U.S. domestic mail image shown in FIG. 4C, the out-of-frame zip code is read in the step S3 of FIG. 7 by using the feature of the mail image 71 as above-described. The detailed operation thereof is described in accordance with the flow of FIG. 9 by referring to the mail image 61 of FIG. 4B. Therefore, more detailed explanation thereof will be omitted here.

A most probable candidate for the zip code cannot be immediately obtained by the in-frame zip code reading section 34 or the out-of-frame zip code reading section 37, if a handwritten numeral as shown in FIG. 2, which is difficult to read, is written on the letter. In this case, a plurality of candidate characters having relatively low similarities are merely obtained.

According to the conventional art, a more detailed character recognition process is performed at this stage, so that confusing characters can be recognized with high accuracy. However, according to this embodiment, the detailed recognition process is not performed, but the flow advances from the steps S2 and S4 to the step S5 for reading the name of the addressee in the destination lines by the addressee name reading section 40 shown in FIG. 1.

To detect an addressee name line from the destination lines, first the destination line detecting section 38 detects destination lines under the control of the addressee name reading section 40. For this purpose, the destination line detecting section 38 uses the results or data of the detection of the destination lines and the results or data of the character recognition of the destination lines, which have been obtained by the operation of reading an out-of-frame zip code described before with reference to FIG. 9 and stored in the memory.

For example, in the case of the mail image 51 shown in FIG. 4A, the lines 54 and 55 are detected as destination lines to be processed; in the case of the mail image 61 shown in FIG. 4B, the lines 64 and 65 are detected as destination lines to be processed; and in the case of the mail image 71 shown in FIG. 4C, the lines 74, 75 and 79 are detected as destination lines to be processed.

In FIGS. 4A and 4B, each of the destination address lines 54 and 64 and the addressee name lines 55 and 65 is one line. However, it is possible that a letter has two or three destination lines as the destination lines 74 and 79 shown in FIG. 4C. In this case, adjacent lines close to one another are integrated as address lines. For example, address lines can be detected by the method disclosed in Japanese Patent Application KOKAI Publication No. 7-265807.

In the case of FIG. 4C, all the lines 74 and 79 of the destination lines 76, other than the addressee name line 75, are address lines. The address lines 74 and 79 are close to one another and distinct from the addressee name line 75.

The direction of arrangement of characters can be estimated on the basis of information such as the position or size of destination lines. A plurality of directions crossing each other, as the lines 54 and 55 and the line 56 in FIG. 4A, may be detected.

Figure 10:
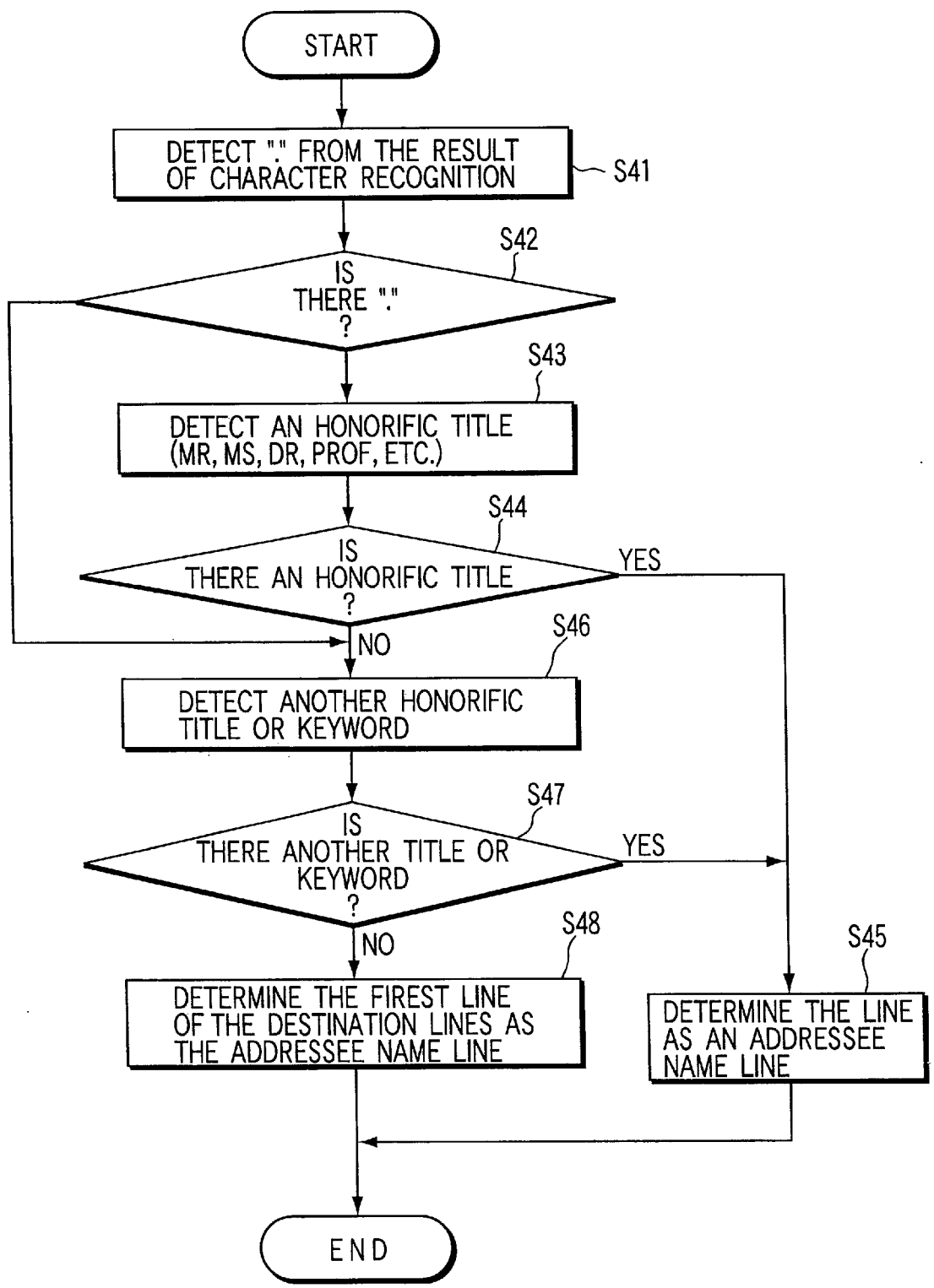
FIG. 10 is a flowchart showing an operation for detecting a line on which the name of an addressee is written.

A name line detecting section 39 checks whether there is an addressee name line in each of the character lines 54, 55, 64, 65, 66, 75 and 76, detected as destination lines in the mail images 51, 61 and 71 shown in FIGS. 4A, 4B and 4C, according to the flow shown in FIG. 10. This operation is executed in the step S55 shown in FIG. 11. The flow shown in FIG. 11 corresponds to the steps S5 and S6 shown in FIG. 7 as will be describe in detail later. In the cases shown in FIGS. 4A and 4B, the name line detecting section 39 reads the data in connection with the detected lines, recognized by the character cutting out section 35 and the character recognizing section 36 and stored in the memory. It picks up the last characters of the respective lines, and detects whether they represent honorific titles, for example, a Chinese character [様] "sama" (corresponding to "Mr." or "Mrs.").

In the case of FIG. 4C, data of a character string stored in the memory is read out and the first word consisting of two characters are checked whether these two characters represent honorific titles such as "Dr" accompanied with a period "Dr.".

The name line detecting section 39 can select a plurality of lines (e.g., last three lines) from the destination lines, as well as one line including an honorific title. For example, when it is necessary to deliver mails in units of company where a number of employees work, not individual addressees with honorific titles. In this case, since a destination company cannot be specified by a personal name, it is necessary to read the company name written before the individual name. To deliver mail, the name of the company, not the personal name, must be detected. Therefore, in a postal district including a number of companies or offices, it is effective to detect an addressee line not by checking the presence of "sama". For example, a company name line can be specified by characters such as a word "Messrs.".

In FIGS. 4A and 4B, since the last characters of the character lines 55 and 65 are "sama", the detecting section 39 detects that the lines 55 and 65 are name lines. The data of the detected name lines are then sent to a name reading section 40, which reads the addressee name with reference to the personal name dictionary D5. The name reading section 40 determines an addressee name based on the results of character recognition executed by the character recognizing section 36 for the respective characters cut out by the character cutting out section 35.

The name reading section 40 outputs candidates for the addressee name based on the read characters. The letters shown in FIGS. 4A and 4B bear the same addressee name [飯塚治], "Iizuka Osamu". For example, as shown in FIG. 5, first to tenth candidates for the respective three Chinese characters are obtained with respect to the addressee name lines 55 and 65. Referring to FIG. 5, the first candidates for the first to third characters are respectively, Chinese characters [飯], "ii", [塚], "zuka", [治], "osamu", and for the fourth character [猿], "saru".

The name reading section 40 analyzes the results of the character recognition of the addressee name line. If the zip code reading section 34 or 37 obtains a result "there is a read candidate" and a fully probable zip code is obtained, the name of the addressee can be determined on the basis of a name list obtained from the personal name dictionary D5 on the basis of the zip code (this method is shown in a disclosure of Japanese Patent Application No. 257318/97: "Word Recognizing Apparatus").

If the name reading section 40 obtains a single fully-probable name with reference to the personal name dictionary D5, the destination address corresponding to the name is obtained from the dictionaries D2, D3 and D4. The operation of reading the destination is thus completed.

When the town name has been determined on the basis of the results of reading the in-frame or out-of-frame zip code, although there are first to tenth candidates for the name of the addressee as shown in FIG. 5, if there is only one person named "Iizuka Osamu" [飯塚治], of the first priority in the town of the postal district, he is determined to be the addressee.

In this case, the first candidate for the fourth character is "saru" [猿], which is not an honorific title. However, since the last character of the addressee name line is generally an honorific title, the honorific title character "sama" [様] of the third priority is used as the candidate.

In the case of a U.S. domestic mail as shown in FIG. 4C, the name of the addressee is generally written in the uppermost line 75 of the destination lines 74, 75 and 79 detected from the mail image 71. To confirm whether the line 75 is an addressee name line, it is checked whether the line 75 includes an honorific expression. In the example shown in FIG. 4C, the honorific title "Dr." is detected in the line 75. An operation for detecting an addressee name line including the honorific title "Dr." will now be described with reference to FIG. 10. As described before, the flow of FIG. 10 corresponds to the step S55 of FIG. 11.

In the operation of reading an out-of-frame zip code as described above with reference to FIG. 9, the destination lines 74, 75 and 79 are detected and the characters in the lines are recognized and stored in the memory. In a first step S41 in FIG. 10, a line including a period "." is detected from the recognized characters stored in the memory.

If a period "." is found, the flow advances from a step S42 to a step S43, wherein an honorific title which should be located before the period "." is detected from the result of character recognition. In the case of FIG. 4C, the honorific title "Dr." is present. Alternatively, it may be "Mr.", "Ms.", "Prof.", "Attn." etc.

If there is an honorific title in a line, the flow advances to a step S45 in which the line is determined to be an addressee name line, and the process is ended.

If there is no honorific title before the detected period ".", the flow advances to a step S46 wherein it is detected whether there is an honorific title such as "Miss" other than those set in the step S43 or another keyword such as "Inc.", "Hospital" and C/O for specifying an addressee. If there is another honorific title or keyword, the flow advances from a step S47 to the step S45. If not, the flow advances to a step S48, in which the first line of the destination line is determined to be an addressee name line in view of the U.S. practice of writing an address.

Figure 11:
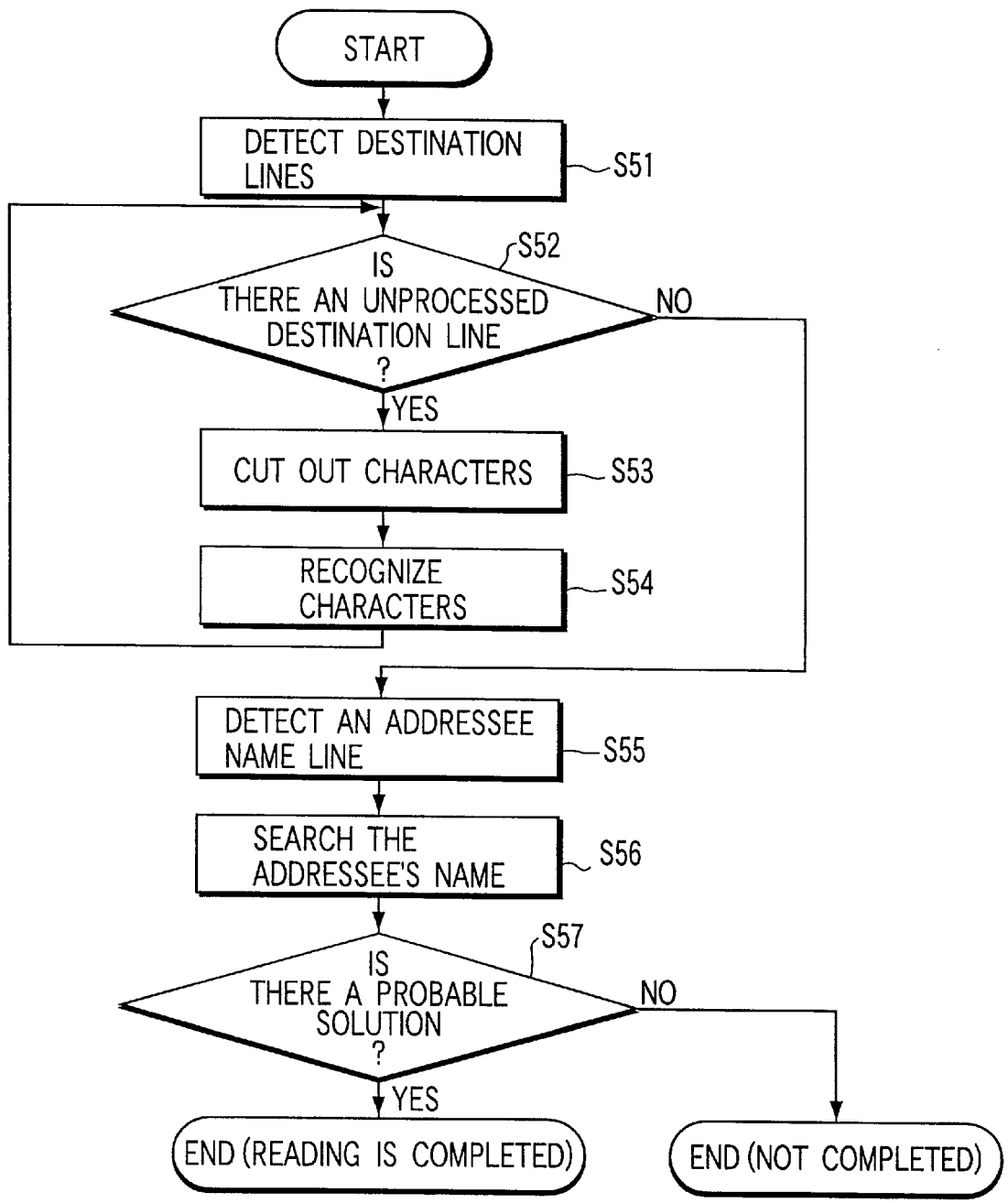
FIG. 11 is a flowchart showing an operation for reading the name of an addressee.

An operation of reading an addressee name from the addressee name line thus determined will be described with reference to the flowchart shown in FIG. 11. The operations in FIG. 11 correspond to the steps S5 and S6 as shown in FIG. 7. In the example of FIG. 4C, the destination line 75 is determined to be an addressee name line, and candidates for 14 characters (the first character "D" to the last character "A"), which have been stored in the memory in the procedure of the steps S31 to S34 shown in FIG. 9, are read. Namely, FIG. 11 shows the steps S5 and S6 in FIG. 7. As described the operation of the step S3 of FIG. 7 by referring to the flow of FIG. 9, a mail item having no in-frame zip code or a U.S. domestic mail item is subjected to the character recognition and the obtained data is stored.

Figure 9:
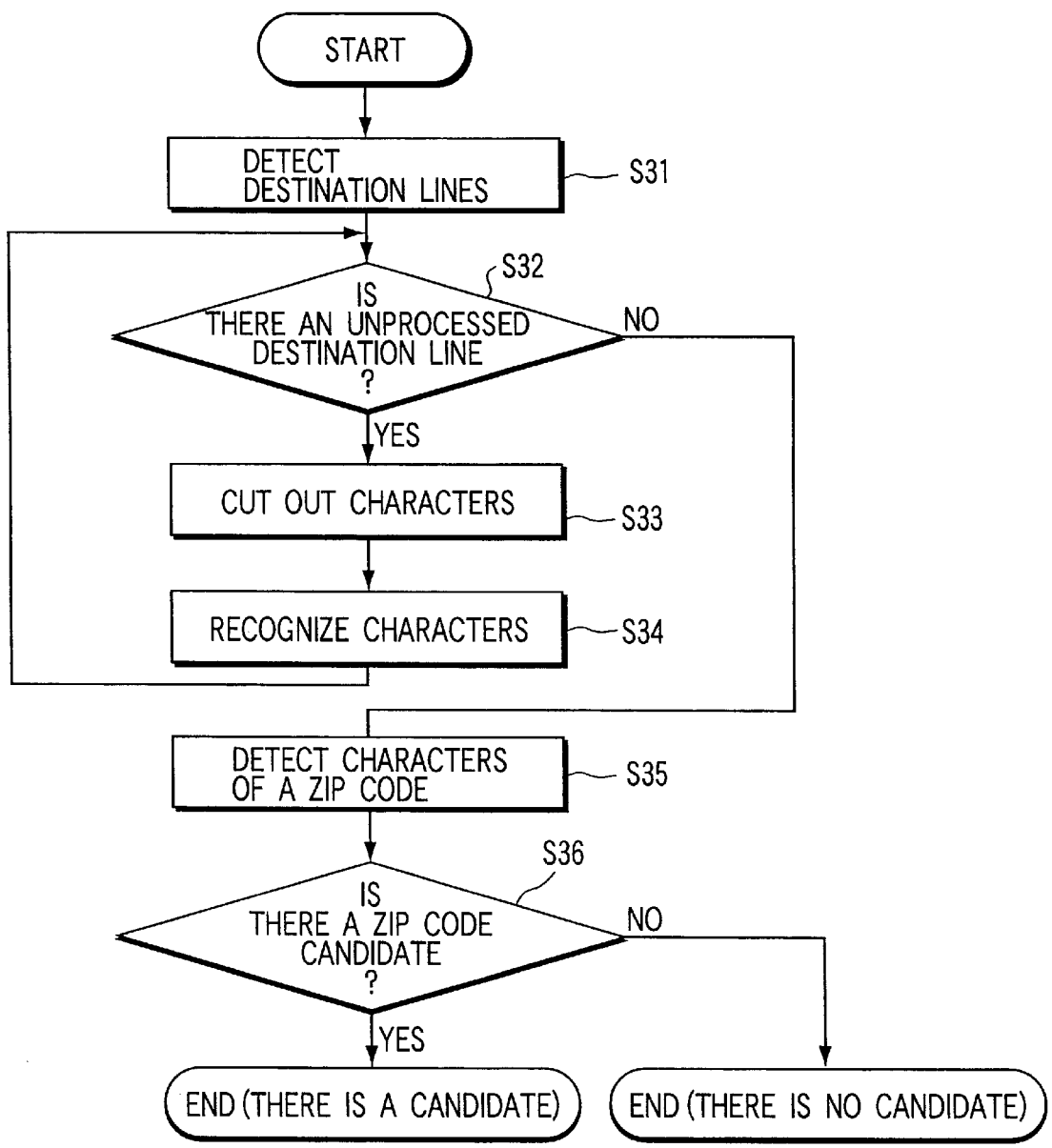
FIG. 9 is a flowchart showing an operation for reading a zip code written out of frames.

Operations in steps S51 to S54 shown in FIG. 11 are the same as those in the steps S31 to S34 shown in FIG. 9. The operations are executed when the step S3 is not performed. Namely, the step S51 is executed by the destination line detection section 38 under the control of the addressee name reading section 40, the step S52 is executed by the name reading section 40, and the steps S53 and S54 are executed by the character cut out section 35 and the character recognizing section 36, respectively.

After an addressee name line is detected in a step S55 by the addressee name line detection section 39 in the method described above with reference to FIG. 10, a search for an addressee name is made in a step S56 by the addressee name reading section 40. FIG. 6 shows first to third candidates for the respective characters in the addressee name line 75 detected in the step S55. Using these candidates, an addressee name is searched with reference to the step S15 of FIG. 8 or the zip code candidate obtained in the step S36 shown in FIG. 9. The searching method will be described later with reference to FIG. 12.

As a result of the search, if a single probable solution is obtained in a step S57, the operation for reading an addressee name is completed. If not, the process is ended as incompletion of the operation for reading an addressee name.

Figure 12:
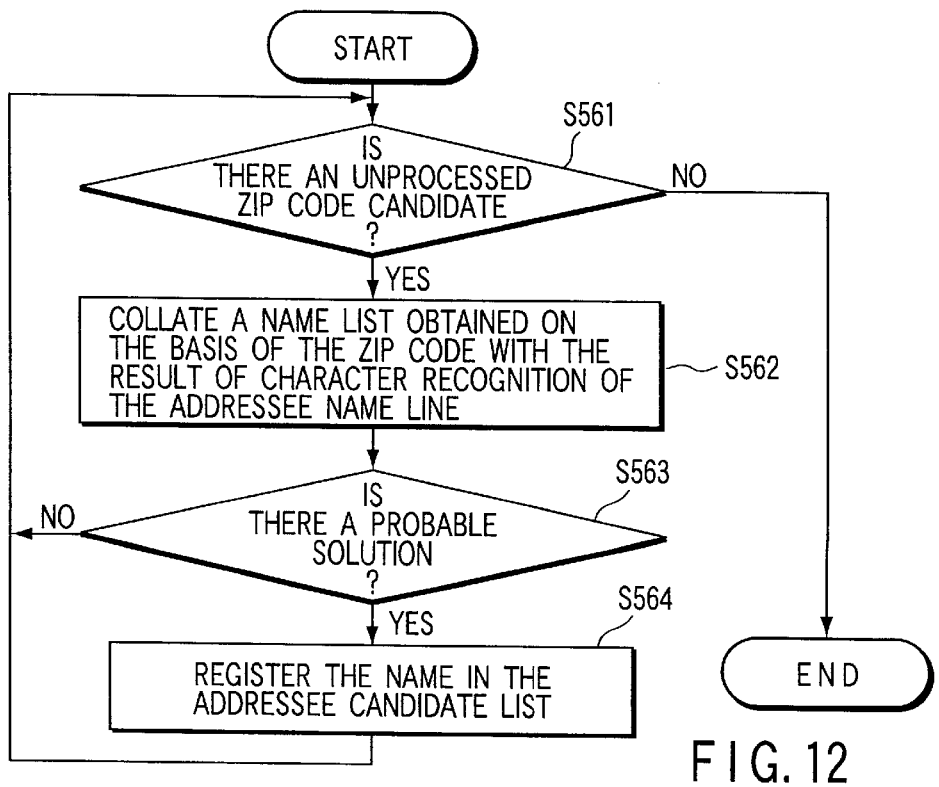
FIG. 12 is a flowchart showing an operation for searching the name of an addressee.

An operation for searching an addressee name in the step S56 of FIG. 11 will be described with reference to FIG. 12, which is also performed by the addressee name reading section 40. In a first step S56 in FIG. 12, it is checked whether there is an unprocessed zip code candidate indicated in or out of the frames. If there is no unprocessed zip code candidate, it means that a zip code candidate has been collated with an addressee name, and an operation for searching an addressee name is not executed.

If there is an unprocessed zip code candidate, the flow advances to a next step S562, in which an addressee name list is extracted on the basis of the zip code candidate with reference to the zip code dictionary D1, and the combination of character candidates of character recognition of the addressee name line is collated with the list, thereby searching a name which coincides with the result.

If a single probable solution is obtained, that is, an addressee name is detected in a step S563, the name is registered in the addressee candidate list in a step S564. Thus, the process is ended.

If no probable solution is obtained in the step S563, or an addressee name candidate is obtained and registered on the basis of the zip code candidate processed in the step S564, the flow returns to the step S561 and the same operation is repeated with respect to another unprocessed zip code candidate.

In the general flow shown in FIG. 7, if the result of reading a zip code obtained by the operations of the steps S1 to S4 performed by the in-frame zip code reading section 34 and the out-of-frame zip code reading section 37 is not definite and no candidate is obtained, or if a zip code is definite while an addressee is not specified because a plurality of candidates for an addressee in the town are obtained from the addressee name reading section 40, the addressee name cannot be specified. Namely, if a plurality of persons whose names are similar with each other reside in an area defined by a zip code, it is not possible to specify an addressee. In this case, the flow advances from the step S4 or S6 to the step S7, in which the address is read by the address reading section 43.

An operation of the address reading section 43 will be described in detail with reference -to FIG. 13. This address reading operation corresponds to those of steps S7 and S8 of FIG. 7 showing the general flow. If there is an unprocessed candidate in the addressee name candidates obtained in the step S5 in FIG. 7, the flow advances from a step S71 to a step S72 in FIG. 13, in which a destination address obtained from the addressee name candidate list is collated with the result of the character recognition of the destination lines, for example, as shown in FIGS. 5 and 6.

In this case, since an addressee name cannot be specified in the step S71, and a town name cannot be specified on the basis of the zip code, a town name is first detected by a town name detecting section 41 shown in FIG. 1. Since the addressee name lines 55, 64 and 75 have been detected for performing the recognition processes of step S34 of FIG. 9 and the step S54 in FIG. 11, the other lines 54, 64, 74 and 79 of the character lines detected by the destination line detecting section 38 are determined to be destination address lines.

From the address lines 54, 64, 74 and 79 thus detected, a town name is first detected by the detecting section 41. As has been described in detail, the town name detecting section 41 searches the town name dictionary D2 for a town name corresponding to the result of the character recognition obtained by the character recognizing section 36 in the step S34 of FIG. 9 and the step S54 in FIG. 11. At this time, the town name can be detected in the direction of the line of the addressee name, which has already been detected.

In the cases of FIGS. 4A and 4B, the zip code can be read as "210-0915". If this zip code is recognized by the step S1 or the step S3, the zip code represents a town name, Yanagi-cho [柳町], Saiwai-ku [幸区], Kawasaki-shi [川崎市] according to the zip code dictionary D1. Therefore, the result of the character recognition is searched for "Yanagi-cho". In the case of FIG. 4C, the zip code is detected as "10017-1234". If the detected zip code represents the Seventh Avenue of the New York City, the search is performed on the Seventh Avenue.

When a plurality of probable addressee names are obtained by the name reading section 40, an address verifying section 42 verifies whether there is a person in the town name detected by the town name detecting section 41 who coincides with any of the addressee names read by the name reading section 40.

In the case of FIGS. 4A and 4B, if Iizuka Osamu [飯塚治], and Iizuka Hiroshi [飯塚浩] reside in an area represented by the zip code "210-0915", both persons can be indicated as candidates for the addressee based on the result of the reading operation executed by the name reading section 40. The names of these two persons are not confusing when they are written in the Alphabetized form. However, when these names are written in the Chinese characters, the patterns thereof are very similar and are very confusing. For example, it is assumed that they reside at the following addresses:

Iizuka Hiroshi: "210-0915-3" (3 Yanagi-cho); and

Iizuka Osamu: "210-0915-4" (4 Yanagi-cho).

The address verifying section 42 verifies which address is indicated. More specifically, if the numeral "3", following the town name "Yanagi-cho", is obtained as a candidate for the lot number with reference to the street number dictionary D3, it is determined that the mail item is addressed to Iizuka Hiroshi. On the other hand, if the numeral "4" is obtained as a candidate for the lot number, it is determined that the mail item is addressed to Iizuka Osamu.

It is assumed in the case of FIG. 4C that names of Dr. OSAMU IIZUKA and Dr. ISAMU IIZUKA are obtained as candidates from the address shown by the read zip code "10017-1234". Further, it is assumed that Dr. OSAMU IIZUKA resides at "7000 Seventh Avenue" and Dr. ISAMU IIZUKA resides at "7001 Seventh Avenue".

In an address verifying section corresponding to the address verifying section 42 of FIG. 1, it is checked that which address is read from the mail image of FIG. 4C. If a candidate "7000" is obtained from a street number dictionary corresponding to the dictionary D3 as a character string showing the address characters following "Seventh Avenue" which is defined by the read zip code, it is possible to determine that Dr. OSAMU IIZUKA is a true destination of this mail. If a candidate "7001" is obtained, it is determined that Dr. ISAMU IIZUKA is a true destination. In the case of FIG. 4C, the read address shows a character string "7000" and the destination is Dr. OSAMU IIZUKA.

In the case of FIG. 4C, if only a person whose name is "Dr. OSAME IIZUKA" is detected to reside in the Seventh Avenue, it is possible to determine that Dr. OSAMU IIZUKA is a sole addressee, even if a part of the address "7000" is not read strictly.

If the characters of the lot number include "2" indistinguishable from "3" as shown in FIG. 2 (a) or "4" indistinguishable from "9" as shown in FIG. 2 (c), according to the conventional method for reading a destination address, it is necessary to discriminate the characters of the lot number in more detail. In contrast, according to the embodiment of the present invention, the address verifying section 42 need only discriminate "3" and "4", need not perform further detailed discrimination in the case of FIGS. 4A and 4B. Thus, the load of character recognition is considerably reduced.

Finally, if an addressee is not specified with the results of the processes executed by the name reading section 40 and the address verifying section 42, an address reading section 43 reads an address following the town name detected by the town name detecting section 41.

The address reading section 43 has functions substantially the same as those of the address verifying section 42. However, to obtain a result from all the possible addresses, it performs a detailed character distinguishing process for more accurately recognizing indistinguishable characters as shown in FIG. 2.

The CPU 30A controls the processes of all these sections and produces a read result of the destination. More specifically, it determines one or two or more probable candidates for each of the town name, the street number, the building number, and the addressee name with reference to the zip code dictionary D1, the town name dictionary D2, the street number dictionary D3, the building name dictionary D4 and the personal name dictionary D5. Candidate information on the town name, the street number, the building name and the addressee name are output as a recognized destination address to a recognition result output processing section 44. Thus, it is determined that "there is a solution", and the process is completed. This operation is performed in a step S73 shown in FIG. 13.

Figure 13:
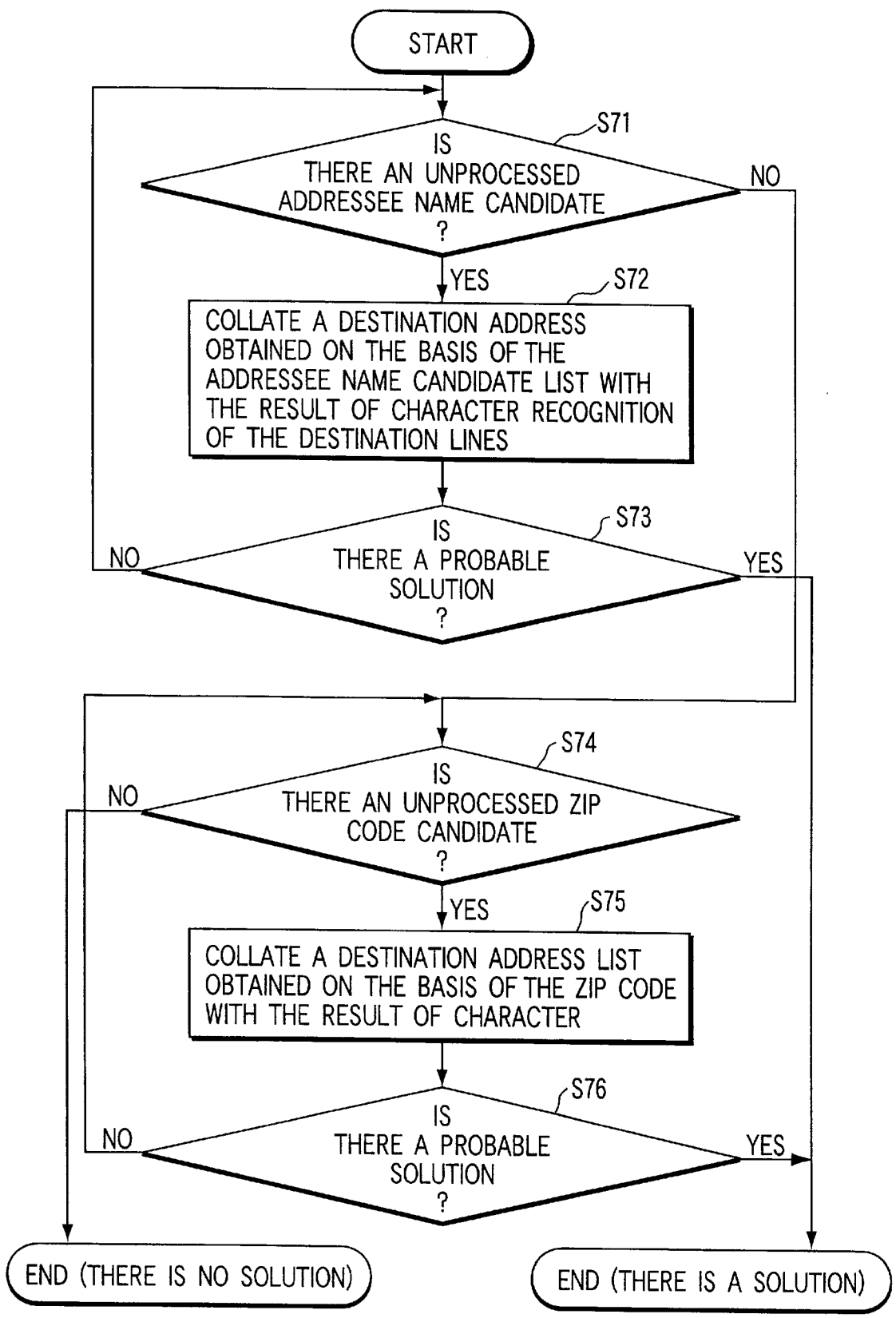
FIG. 13 is a flowchart showing an operation for reading an address.

On the other hand, if there is no unprocessed candidate for the addressee name in a step S71 shown in FIG. 13, the flow advances to a step S74, in which it is checked whether there is an unprocessed candidate for the zip code. If there is no unprocessed zip code candidate, it is determined that "there is no solution", and the process is completed. If there is an unprocessed zip code candidate, the destination address list obtained from the zip code is collated with the results of the character recognition of the destination lines in a next step S75.

As a result of the collation, if a destination address, which coincides with the result of the character recognition, is detected from the destination address list, it is determined that the address is "a probable solution" in a step S76. Then, the process is completed.

When it is recognized that a solution is obtained in the steps S6 and S7 in FIG. 7, the mail items can be sorted in the sorting pocket 15 or a bar code corresponding to the read zip code can be printed by the printing section 10.

As has been described above, according to the present invention, a mail address reading apparatus having various advantages, as described below, can be obtained. When indistinguishable handwritten Arabic numerals of a zip code or a lot number are recognized, the addressee name is read in order to avoid detailed character recognition which takes a considerable process time, thereby shortening the process time. As a result, the total reading capacity can be increased. Moreover, since the direction of the character line is determined on the basis of the result of reading the addressee name, when the street number in the destination address is detected later, the direction of the character can be detected assuredly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mail address reading apparatus comprising:

first reading means for reading a zip code recorded on a mail item to obtain at least one zip code candidate;

second reading means for reading an addressee name recorded on the mail item, the second reading means including: destination line detecting means for detecting a recorded character line; recognizing means for recognizing a last character of the character line or characters with a period at a beginning of the character line detected by the destination line detecting means; and determining means for, when the last character recognized by the recognizing means is an honorific character following the addressee name or when the characters recognized by the recognizing means is an honorific word positioned in front of the addressee name, determining the character line as an addressee name line;

third reading means for reading a destination address including a town name and a street number recorded on the mail item in a same direction as that of the addressee name line determined by the second reading means; and control means for determining a destination based on the zip code, the addressee name and the destination address read by the first to third reading means.

2. The mail address reading apparatus according to claim 1, wherein the control means include means for, when the zip code candidate is not obtained by the first reading means, performing a process for reading an addressee name by said second reading means without performing detailed recognition of the zip code.

3. The mail address reading apparatus according to claim 1, wherein the control means include:

means for determining a town name based from the zip code read by the first reading means; and an address verifying section for checking whether the destination address coincides with an address of the addressee name read by the second reading means in a postal district represented by the town name and determining the address of the addressee as a destination.

4. A mail sorting apparatus comprising:

first reading means for reading an address image of a mail item;

destination detecting means for detecting a destination from the address image read by the first reading means; and sorting means for sorting the mail item based on the destination detected by the destination detecting means, the destination detecting means including:

second reading means for reading a zip code recorded on the mail item to obtain at least a zip code candidate;

third reading means for reading an addressee name recorded on the mail item, the third reading means including: destination line detecting means for detecting a recorded character line; recognizing means for recognizing a last character of the character line or characters with a period at a beginning of the character line detected by the destination line detecting means; and determining means for, when the last character recognized by the recognizing means is an honorific character following the addressee name or when the characters recognized by the recognizing means is an honorific word positioned in front of the addressee name, determining the character line as an addressee name line;

fourth reading means for reading a destination address including a town name and a street number recorded on the mail item in a same direction as that of the addressee name line determined by the third reading means; and control means for determining a destination based on the zip code, the addressee name and the destination address read by the second to fourth reading means.

5. The mail sorting apparatus according to claim 4, wherein the control means include means for, when the zip code candidate is not obtained by the second reading means, performing a process for reading an addressee name without performing detailed recognition of the zip code.

6. The mail sorting apparatus according to claim 4, wherein the control means include:

means for determining a town name based from the zip code read by the first reading means; and an address verifying section for checking whether the destination address coincides with an address of the addressee name read by the third reading means in a postal district represented by the town name and determining the address of the addressee as a destination, when the destination address is detected to be coincidence with the address of the addressee name.

7. A mail address reading apparatus comprising:

first reading means for reading an in-frame zip code recorded in zip code frames on a mail item to obtain at least a candidate of the in-frame zip code;

second reading means for reading an out-of-frame zip code recorded in a destination line to obtain at least a candidate of the out-of-frame zip code, when no in-frame zip code is read by the first reading means;

third reading means for reading an addressee name recorded on the mail item, when at least one of the candidates for the in-frame zip code and the out-of-frame zip code out is obtained;

means for verifying whether a single solution of a destination is obtained with reference to information on the addressee name read by the third reading means and at least one of the candidates for the in-frame and out-of-frame zip codes;

fourth reading means for reading a destination address including a town name and a street number recorded on the mail item, when the candidate for the out-of-frame zip code is not obtained and when a single solution of a destination is not obtained; and means for determining a destination based on the destination address read by the fourth reading means.

8. The mail address reading apparatus according to claim 7, wherein the third reading means include means for cutting out and recognizing individual characters of a destination line and means for storing a result of recognition.

* * * * *